United States Patent [19]

Hata

[11] Patent Number: 5,555,337
[45] Date of Patent: Sep. 10, 1996

[54] SURFACE WAVE GUIDELINE AND OBJECT DETECTING DEVICE USING SURFACE WAVE GUIDELINE

[75] Inventor: Hiroshi Hata, Nagano, Japan

[73] Assignee: MK Seiko Co., Ltd., Japan

[21] Appl. No.: 347,895

[22] Filed: Dec. 1, 1994

[30] Foreign Application Priority Data

Dec. 16, 1993 [JP] Japan ................. 5-344207

[51] Int. Cl.⁶ ............................................. G02B 6/44
[52] U.S. Cl. .................... 385/101; 385/104; 385/100; 250/227.16
[58] Field of Search .................. 385/100, 101, 385/102, 103, 104, 112, 114, 12, 13; 250/227.11, 227.15, 227.16

[56] References Cited

U.S. PATENT DOCUMENTS 4,552,432  11/1985  Anderson et al. .................. 385/101
5,261,021  11/1993  Pasta et al. ..................... 385/101 X
5,325,457  6/1994   Bottoms, Jr. et al. .............. 385/100

FOREIGN PATENT DOCUMENTS 1571110  7/1980  United Kingdom ................. 385/104

*Primary Examiner*—John D. Lee
*Assistant Examiner*—Phan T. H. Palmer
*Attorney, Agent, or Firm*—Harris, Wallen, MacDermott & Tinsley

[57] ABSTRACT

An electromagnetic surface wave guideline that is formed by intertwisting dielectrics while providing a periodic structure like a rope and arranging conductors in a period harmonizing with the structure, and is suitable for such a use that entry of various objects including human beings and animals into a specific area for instance, and an object detecting device using the guideline

4 Claims, 2 Drawing Sheets

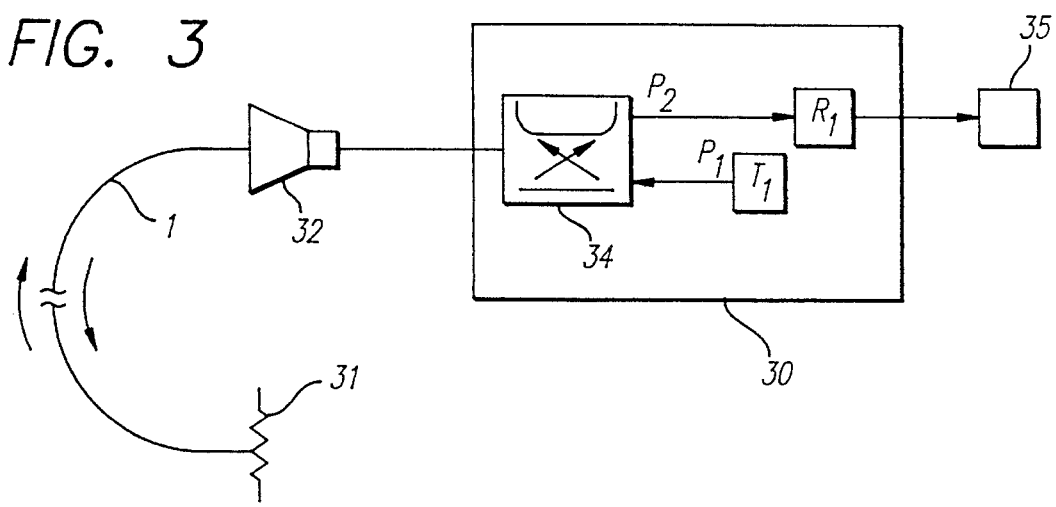
FIG. 3
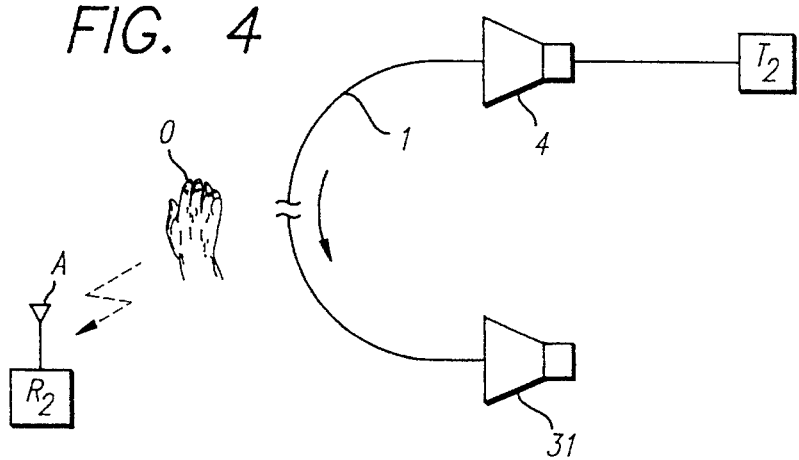
FIG. 4
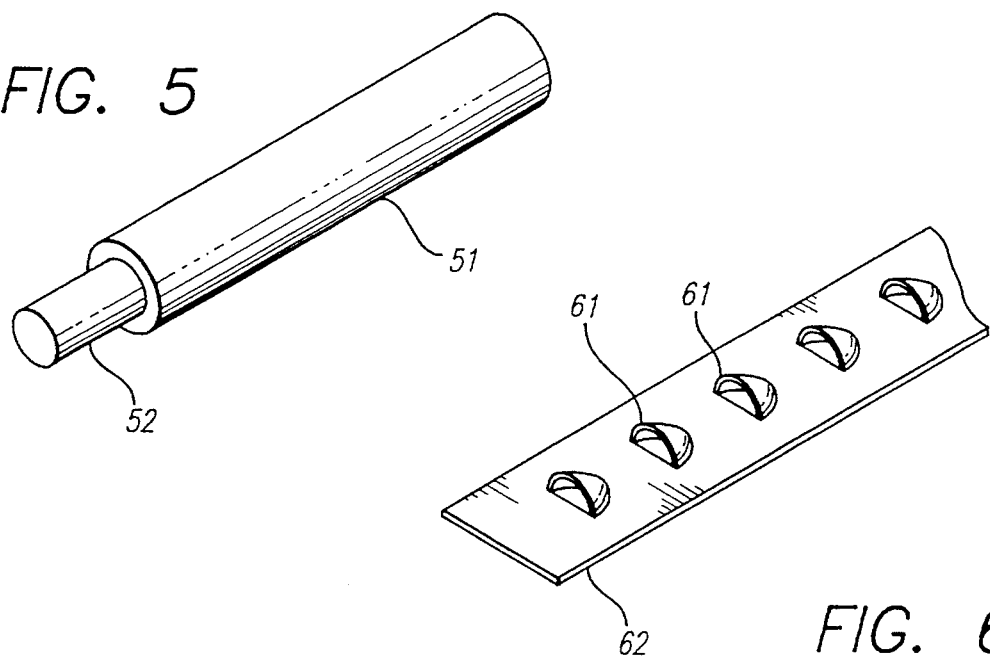
FIG. 5
FIG. 6

SURFACE WAVE GUIDELINE AND OBJECT DETECTING DEVICE USING SURFACE WAVE GUIDELINE

BACKGROUND OF THE INVENTION

1. Field of the Invention

The present invention relates to a guideline of an electromagnetic surface wave and a device for detecting an object using the guideline, and more particularly to a device suitable for the use of detecting entry of various objects including human beings and animals into a specific area in a field of construction, stock-farming, agriculture or the like, for the purpose of prevention of crimes or the like.

2. Description of the Prior Art

A device for detecting an object entering into a specific area using infrared rays or supersonic waves has been heretofore known as a device for detecting an object. Such a conventional detecting device has a drawback that signals are dispersed and detection thereof over such a long distance that exceeds 10 m is difficult since infrared signals or supersonic signals are radiated into space, and no device that can be used in the fields of construction, stock-farming and agriculture, etc. in particular could not be found in the fields of utilization mentioned above.

Accordingly, such an idea has been hit upon that an electromagnetic surface wave guideline is used as means for transmitting signals in a range exceeding 10 m by controlling diffusion off the signals, and a phenomenon that is generated by a fact that the object approaches or comes into contact with the electromagnetic surface wave guideline is detected. A Goubau line such as shown in FIG. 5 has been heretofore known as such a surface wave guideline. The Goubau line has a structure that a conductor wire portion 52 such as copper is covered with a dielectric 51 such as plastic or enamel, and has been once applied in common viewing of television or the like. Further, a surface wave guideline having such a periodic structure as shown in FIG. 6 is also known, in which periodic structural portions 61 and a ground plate portion 62 are formed by pressing a sheet metal such as aluminum, and is used when it is installed on the ground for transmitting the surface wave.

SUMMARY OF THE INVENTION

Now, such a well-known surface wave guideline has not been able to be applied as it is to a device for detecting an object due to various restrictions in point of the structure. Namely, it is required to install the surface wave guideline spatially by some means in the area adopted as the object of detection in accordance with a conceivable use, thus requiring a surface wave guideline that has tensile strength and flexibility and is as light in weight as possible and inexpensive, and these requirements cannot be met fully with the Goubau line mentioned above. Further, the surface wave guideline of a type shown in FIG. 6 has no flexibility at all in the direction of the ground plate face, and moreover, can be used only in a limited configuration such as installation on the ground.

Therefore, a first subject of the present invention exists in a point whether a new surface wave guideline suitable for detecting an object is obtainable or not.

Further, a second subject of the present invention exists in a point whether a device capable of detecting an object over such a range that exceeds 10 m is obtainable or not by using such a surface wave guideline.

According to the present invention, it is intended to solve the above-mentioned first object by intertwisting dielectrics or dielectric fibers having little high Frequency loss while providing a periodic structure like a rope and arranging conductors inside or outside thereof in a period harmonizing with the structure.

Besides, it is desirable that the surface wave guideline is covered with a weatherproof film material on the outside.

Furthermore, according to the present invention, it is intended to solve the second subject by providing, in a device for detecting approach or contact by an object, a transmitting portion for applying a surface wave to the surface wave guideline, a receiving portion for receiving the surface wave propagated through the surface wave guideline, and a detecting portion for outputting a detected signal assuming that approach or contact by the object has been made to or with the surface wave guideline when a level of the surface wave received by the receiving portion is a predetermined level or lower.

Further, it may also be arranged to solve the second subject in the present invention by providing, in a device for detecting approach or contact by an object, a transmitting portion for applying a surface wave to the surface wave guideline, a receiving portion for receiving a reflected surface wave generated by approach or contact by the object to or with the surface wave guideline, and a detecting portion for outputting a detected signal assuming that approach or contact by the object has been made to or with the surface wave guideline when a reflected wave at a predetermined level or higher is received by the receiving portion.

Besides, it may also be arranged to solve the second subject in the present invention by providing, in a device for detecting approach or contact by an object, a transmitting portion for applying a surface wave to the surface wave guideline, a receiving portion for receiving a scattered wave from the surface wave guideline, and a detecting portion for outputting a detected signal assuming that approach or contact by the object has been made to or with the surface wave guideline when a scattered wave at a predetermined level or higher is received by the receiving portion.

Further, it is sufficient to output display or an alarm based on the detected signal from the detecting portion in a device for detecting an object such as one described above.

According to the present invention, it is possible to obtain tensile strength and flexibility sufficient for stretching in an area adopted as the object of detection by intertwisting dielectrics or dielectric fibers like a rope. Moreover, conductors are formed in a spiral form so as to show a periodic structure by arranging the conductors in a period of harmonizing with these dielectrics, and it becomes possible to perform very efficient surface wave transmission when a surface wave of a frequency corresponding to the periodic structure is used. Farther, it becomes possible to transport a surface wave using dielectrics such as nylon or polyethylene that have not so high permittivity but is inexpensive and comparatively light in weight by providing the periodic structure.

Further, it is possible to reduce such influence that the dielectrics get wet in the rain and the permittivity fluctuates at time of outdoor use by covering the outside of the surface wave guideline with a weatherproof film material.

Moreover, by disposing such a surface wave guideline in an area adopted as an object of detection and furnishing the surface wave guideline with a surface wave, it is possible to generate an electromagnetic field in a pretty wide range in a peripheral space of the surface wave guideline and to detect a phenomenon produced by a fact that an object such as human beings and animals enters into the electromagnetic field at a level of the surface wave propagated or reflected through the surface wave guideline or a level of the scattered wave from the surface wave guideline.

BRIEF DESCRIPTION OF THE DRAWINGS

Embodiments of the present invention will be described in detail hereinafter with reference to the drawings, wherein:

FIG. 3 is an explanatory block diagram showing an embodiment of a reflect type object detecting device using a surface wave guideline according to the present invention;

FIG. 4 is an explanatory block diagram showing an embodiment of a scatter type object detecting device using a surface wave guideline according to the present invention;

FIG. 5 is an explanatory view showing a conventional example of a surface wave guideline; and FIG. 6 is an explanatory view showing a conventional example of a surface wave guideline.

DETAILED DESCRIPTION OF THE PREFERRED EMBODIMENTS

Figure 1:
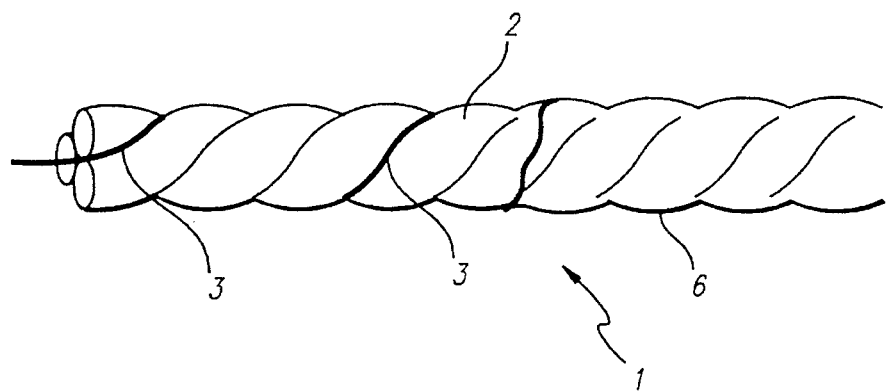
FIG. 1 is an enlarged explanatory view showing an embodiment of a surface wave guideline according to the resent invention.

In FIG. 1, in a surface wave guideline 1, a plurality of fiber bundles 2 are formed using a dielectric material such as plastic having little high frequency loss, these bundles are intertwisted spirally so as to Form into a rope form, and a conductor 3 is arranged spirally in a similar period along these fiber bundles 2. With this, a surface wave guideline having tensile strength and flexibility equivalent to those of an ordinary rope are obtainable, and can be used in a variety of configurations.

Besides, the conductor 3 in the surface wave guideline 1 may be either one line or a plurality of lines in number. In particular, when three lines of conductors 3 are arranged along three lines of fiber bundles 2, respectively, three lines of conductors are arranged at equal spaces putting dielectrics therebetween, any conductor shows a same phase without showing positive or negative polarity, and the transmitted surface wave has almost no electric field component that crosses the dielectric. Hence, it is possible to transmit a surface wave without being subjected to a large influence by the change of a dielectric loss of the dielectrics, and a desirable result is obtainable even in environment where it gets wet in the rain sometimes.

Further, since the conductors 3 are installed spirally so as to provide a periodic structure in the surface wave guideline 1, it becomes possible to transmit a surface wave very efficiently by having this periodic structure and the frequency of the surface wave match with each other.

A reference numeral 6 is a covering film of the surface wave guideline 1, which is adapted so as to provide the guideline 1 with weather resistance and abrasion resistance. Since effective permittivity changes when dielectrics get wet in the rain and influence is exerted on the propagation of the surface wave for those that are intended to be used outdoor in particular, it is desirable to apply covering in order to prevent such troubles.

Figure 2:
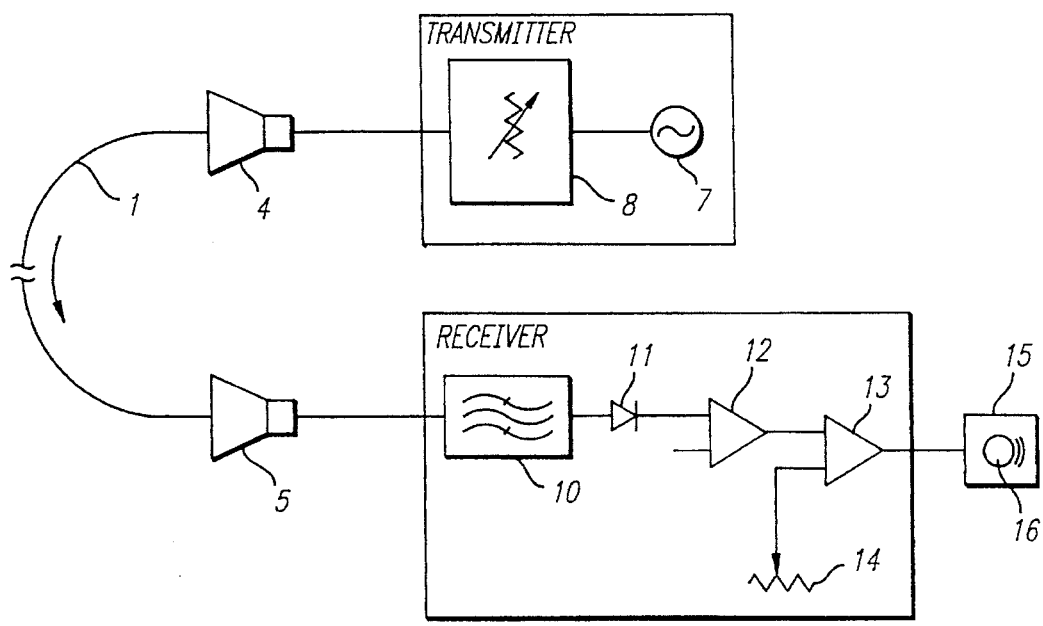
FIG. 2 is an explanatory block diagram showing an embodiment of a transmit type object detecting device using a surface wave guideline according to the present invention.

An embodiment of an object detecting device using the surface wave guideline 1 described above will be described hereunder with reference to FIGS. 2 to 4. FIG. 2, FIG. 3 and FIG. 4 are explanatory block diagrams showing a transmit type detecting device for detecting a transmitted wave of the guideline 1, a reflect type detecting device for detecting a reflected wave on the guideline 1 and a scatter type detecting device for detecting a scattered wave from the guideline 1, respectively.

In FIG. 2, the surface wave guideline 1 is stretched for use at a boundary portion of a specific area adopted as the object of detection, and one end of the guideline 1 is connected to a transmitter T through a wave projector 4 on the transmitting side and another end thereof is connected to a receiver R through a wave projector 5 on the receiving side.

The transmitter T is provided with an oscillator 7 and an attenuator 8, and outputs a TEM wave of such a frequency (principally a frequency band of VHF, UHF or microwave) that is capable of outputting a surface wave of a frequency matching with the periodic structure of the surface wave guideline 1. The output level (electric power) of this TEM wave is always maintained constant, but it is sufficient to provide an output variable means so that the output level may be changed in accordance with the length when it is required to change the length of the surface wave guideline 1 used.

The receiver R is provided with a band-pass Filter 10, a detector 11, an amplifier 12, a comparator 13 and a sensitivity controller 14, and receives the surface wave propagated by the surface wave guideline 1 after converting it into a TEM wave through the wave projector 5 on the receiving side. A detected signal from the comparator 13 is sent to an alarm unit 15. 16 represents a buzzer provided in the alarm unit 15.

In the present embodiment, the TEM wave outputted from the transmitter T is converted into a surface wave in the wave projector 4 on the transmitting side and is propagated through the surface wave guideline 1 in a surface wave mode and inputted to the receiver R after being converted into the TEM wave again in the wave projector 5 on the receiving side. Thus, a detecting area by the surface wave is formed around the surface wave guideline 1. When an object such as human beings and animals approaches and enters into this detecting area, the surface wave parts from the guideline 1 and scatters at that part. Therefore, the level of the surface wave sent to the receiver R side is lowered in the guideline 1.

Besides, the detecting area is changed in accordance with the frequency of the surface wave, the permittivity of the dielectric and the diameter of the guideline 1 and so on, and can be set to the extent suited for the use by setting these respective elements appropriately. Further, it is also possible to specify the extent of the detecting area to some extent by regulating the output level from the transmitter T and the receiving sensitivity in the receiver R.

Although an external noise wave is picked up sometimes in the surface wave guideline 1, such a noise wave is removed by the band-pass filter 10 in the receiver R, and only the signals transmitted in the surface wave mode are sent to the detector 11. This detected output is sent to the comparator 13 through the amplifier 12, in which the level of the received signal is compared with a predetermined level that is set by the sensitivity controller 14, and, when the reception level is at the predetermined level or lower, an alarm driving signal is outputted to the alarm unit 15.

As described, it is possible in the transmit type detecting device to send the signal outputted from the transmitter T to the receiver R while transmitting the signal in the surface wave mode, and to detect whether the detected body has approached in the interim and output an alarm. Further, the signal output from the transmitter T may be very feeble since it is guided through the surface wave guideline 1 and not dispersed, and does not become an object of regulation of the Wireless Telegraphy Act. According to experiments of the applicant, it has been confirmed that it is possible to detect an object with an output of several microwatts when the length of the surface wave guideline 1 is several 10 m or shorter.

In FIG. 3, a matched termination 31 is formed at one end of the surface wave guideline 1, and a wave projector 32 for transmission and reception is provided at another end, and is connected to a detecting device body 30. In the detecting device body 30, a main line is connected to the wave projector 32 for transmission and reception through a directional coupler 34, and a transmitting portion $T_1$ and a receiving portion $R_1$ are connected to a main line input port $P_1$ and a sub-line rearward output port $P_2$ of the coupler 34, respectively.

Here, a TEM wave of a predetermined frequency is outputted from the transmitting portion $T_1$, and the TEM wave reaches the wave projector 32 through the directional coupler 34 and is converted into a surface wave. In the guideline 1, the surface wave normally reaches the matched termination 31 and is absorbed and is not reflected therefrom, but, when an object 0 to be detected enters into the detecting area, the reflected surface wave therefrom returns to the wave projector 32 and is returned to a TEM wave, which is brought to the receiving portion $R_1$ through the coupler 34. In the receiving portion $R_1$, the reception level is compared with a predetermined level set similarly to the receiver R described above, and an alarm driving signal is outputted to the alarm unit 35 when the reception level is at a predetermined level or higher.

As described above, it is possible, in the reflect type detecting device, to structure so as to receive a surface wave that returns on the same surface wave guideline 1 after reflection, thereby to put the transmitting portion $T_1$ and the receiving portion $R_1$ together at one location. Further, when a one-dimensional radar system that makes it possible to specify a reflection point by the time difference from output of the signal in the transmitting portion $T_1$ until reception of the reflected signal at the receiving portion $R_1$ is adopted in the reflect type, it is possible to accurately know the approaching point of the object on the surface wave guideline 1.

In FIG. 4, a transmitter $T_2$ applies a surface wave to the surface wave guideline 1 similarly to the above example, but one set or more of receivers $R_2$ each provided with a receiving antenna A are installed at positions appropriately apart (1 m or more) from the surface wave guideline 1, and receive the scattered wave from the guideline 1. Namely, the receiver $R_2$ receives a radiated wave scattered by the object that approaches the surface wave guideline 1, and an alarm is outputted when reception at a predetermined level or higher is made.

This scatter type detecting device is also suitable when it is desired to specify to some extent the position of the surface wave guideline 1 where the object has approached, and it is possible to specify approach of the object and the position thereof by installing a plurality of receivers $R_2$ in accordance with the positions desired to be inspected with respect to the guideline 1 and confirming where a scattered wave at a predetermined level or higher has been detected.

As described above, according to the present invention, the guideline has tensile strength and flexibility since it is formed in a rope form and is suited for spatial stretching. Moreover, a periodic structure being provided, it is possible to transmit a surface wave while controlling the distribution range of the electromagnetic field to some extent. Thus, a surface wave guideline suitable for detecting an object is obtainable.

Further, by detecting approach or contact by an object using such a surface wave guideline system, a device capable of detecting an object over such a range that exceeds 10 m that has been heretofore difficult and outputting a real time alarm is obtainable.

Besides, it is apparent that the present invention is not limited to the embodiments described above, but that it is applicable to widely different embodiments without departing from the scope of claims described hereunder.

What is claimed is:

1. An object detecting device using a surface wave guideline, characterized in that dielectrics or dielectric fibers having little high frequency loss are intertwisted in a periodic structure like a rope, and conductors are arranged inside or outside thereof in a period harmonizing with said periodic structure, and further characterized in that, in a device for detecting approach or contact by an object, there are provided a transmitting portion for applying a surface wave to said surface wave guideline, a receiving portion for receiving a scattered wave from the surface wave guideline, and a detecting portion for outputting a detected signal assuming that approach or contact by the object has been made to or with said surface wave guideline when a scattered wave at a predetermined level or higher is received by the receiving portion.

2. An object detecting device according to claim 1, wherein there is provided an output portion for giving an indicator output based on a detected signal from the detecting portion.

3. An object detecting device using a surface wave guideline, characterized in that dielectrics or dielectric fibers having little high frequency loss are intertwisted in a periodic structure like a rope, and conductors are arranged inside or outside thereof in a period harmonizing with said periodic structure, and further characterized in that, in a device for detecting approach or contact by an object, there are provided a transmitting portion for applying a surface wave to said surface wave guideline, a receiving portion for receiving a surface wave propagated through the surface wave guideline, and a detecting portion for outputting a detecting signal assuming that approach or contact by the object has been made to or with said surface wave guideline when a level of the surface wave received by the receiving portion is a predetermined level or lower.

4. An object detecting device using a surface wave guideline, characterized in that dielectrics or dielectric fibers having little high frequency loss are intertwisted in a periodic structure like a rope, and conductors are arranged inside or outside thereof in a period harmonizing with said periodic structure, and further characterized in that, in a device for detecting approach or contact by an object, there are provided a transmitting portion for applying a surface wave to said surface wave guideline, a receiving portion for receiving a reflected surface wave by approach or contact by the object to or with the surface wave guideline, and a detecting portion for outputting a detected signal assuming that approach or contact by the object to or with said surface wave guideline when a reflected wave at a predetermined level or higher is received by said receiving portion.

* * * * *